United States Patent [19]
Nickols, Jr.

[11] 3,945,844
[45] Mar. 23, 1976

[54] ELECTROCHEMICAL CELL

[75] Inventor: Richard C. Nickols, Jr., South Windsor, Conn.

[73] Assignee: United Aircraft Corporation, East Hartford, Conn.

[22] Filed: Aug. 18, 1971

[21] Appl. No.: 172,655

[52] U.S. Cl. .............................. 136/86 R; 136/161
[51] Int. Cl.² ...................... H01M 2/00; H01M 8/02
[58] Field of Search ............. 136/86 R, 86 B, 86 C; 260/37 M

[56] References Cited
UNITED STATES PATENTS

| | | | |
|---|---|---|---|
| 3,224,501 | 12/1965 | Burdick et al. | 260/37 M |
| 3,411,951 | 11/1968 | Gelting | 136/86 R |
| 3,476,530 | 11/1969 | Ehrreich et al. | 260/37 M |

*Primary Examiner*—G. L. Kaplan
*Assistant Examiner*—H. A. Feeley
*Attorney, Agent, or Firm*—A. W. Breiner

[57] ABSTRACT

An electrochemical cell comprising an anode, a cathode, and an electrolyte in combination with support or coolant plates fabricated from a polymer/metal composite, such as polysulfone/nickel, is described. The plates are relatively inexpensive, easily fabricated, have good thermal conductivity, low electrical resistance, and good structural stability.

10 Claims, 1 Drawing Figure

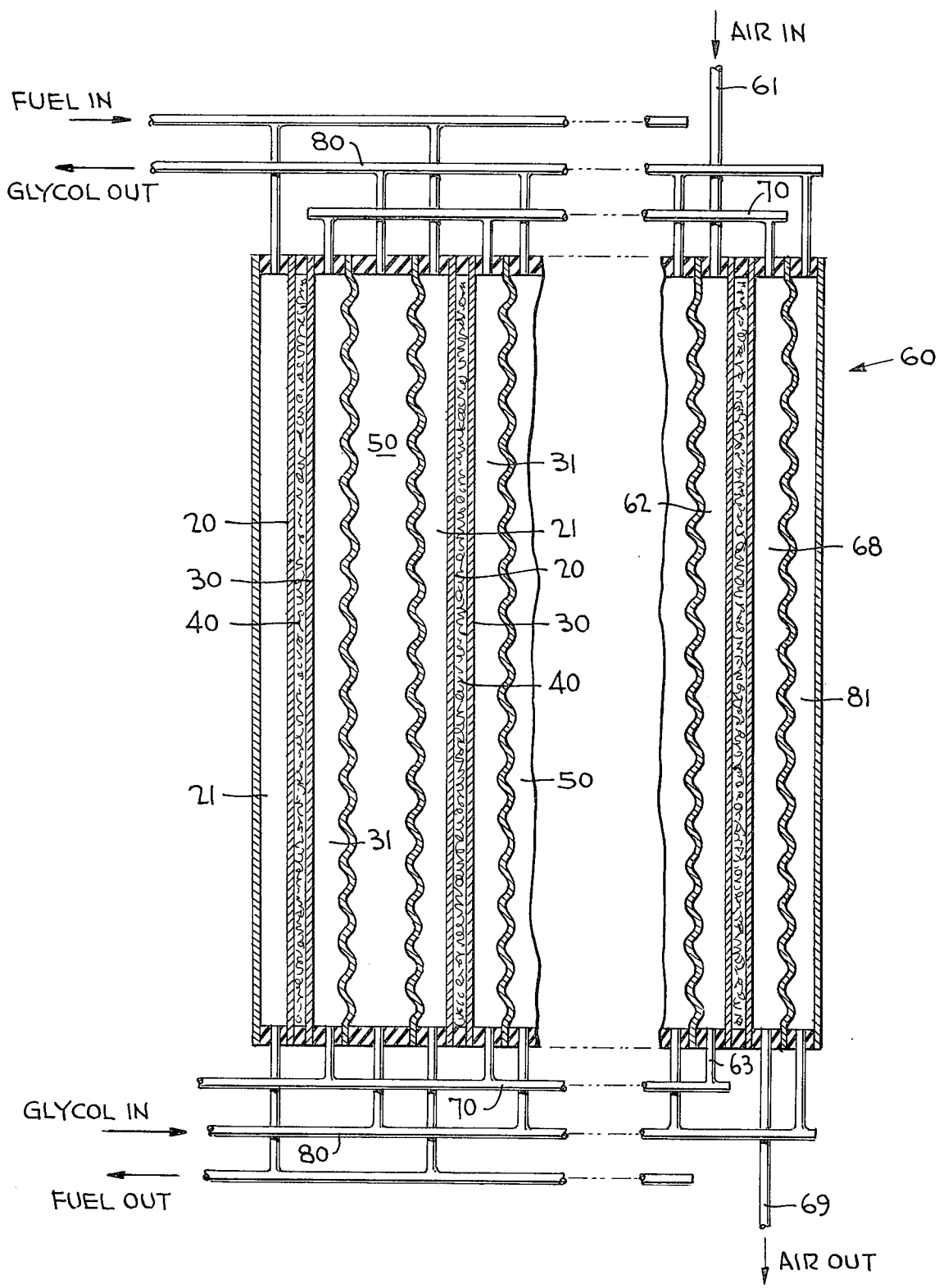

ELECTROCHEMICAL CELL

FIELD OF INVENTION AND BACKGROUND

This invention relates to improved electrochemical devices of the type comprising an anode, a cathode, and an electrolyte in combination with support and/or coolant plates. More particularly, this invention relates to an electrochemical device utilizing a relatively low cost, lightweight support or coolant plate comprising a polymer/metal composite such as polysulfone/nickel. For convenience hereinafter, the invention will be described with reference to a fuel cell for the direct generation of electricity utilizing two non-consumable electrodes. As will be apparent, however, similar considerations governing the use of the invention in fuel cells will apply to other electrochemical devices enabling the use of the invention in such devices.

A fuel cell, as the term is employed herein, designates an electrochemical cell for the direct generation of electrical energy from a fuel and oxidant. With such cells, it is not necessary to go through the usual conversion of chemical energy to heat energy to mechanical energy to electrical energy as is common with heat engines. Such cells in their most simplified design comprise a housing, an oxidant electrode, a fuel electrode, an electrolyte, and means for feeding the fuel and oxidant to the respective electrodes. In operation, it is necessary that the fuel and oxidant contact a surface of their respective electrodes where a process of adsorption and desorption occurs leaving the electrodes electrically charged, with the second surface of the electrodes being in contact with the electrolyte. Depending upon the nature of the electrolyte, ions are transferred through the electrolyte from the anode to cathode, or from the cathode to the anode. Electrical current is withdrawn from the cell and passed through a suitable load where work is accomplished.

A problem associated with fuel cells is in the accommodation of reaction by-products formed during the operation of the cell. In the case where hydrogen is the fuel and oxygen is the oxidant, the by-product formed is water. An additional problem associated with such cells is heat transfer, i.e., supply of heat during start-up, and control of heat during operation of the cell. Accordingly, support and/or coolant plates are constructed and arranged with the cells to facilitate by-product (water) removal, distribution of reactant gases, and to remove and/or supply heat to the cell, or battery of cells. These plates must be light in weight, have good thermal conductivity, low electrical resistance, low thermal expansion, low shrinkage, and generally good structural stability. In view of the aforesaid requirements, polymer plates, although suggested for such use, are not completely acceptable in view of the low thermal conductivity and their electrical non-conductivity or resistivity. Metal plates are not completely acceptable in view of their high cost and susceptibility to corrosion.

OBJECTS AND GENERAL DESCRIPTION

Accordingly, it is a primary object of the present invention to provide a support and/or coolant element for use in an electrochemical cell which is low in cost, light in weight, possesses essential properties such as good thermal conductivity, good structural stability, low electrical resistance, and low thermal expansion.

It is another object of the present invention to provide an electrochemical device which is light in weight and highly efficient comprising support or coolant plates in combination with an anode, a cathode, and an electrolyte which permits inexpensive construction while having essential characteristics such as good thermal conductivity and over-all structural integrity as well as low electrical resistance, thermal expansion, and the like.

These and other objects of the invention will be more readily apparent from the following detailed description with particular emphasis being placed on the embodiment illustrated in the drawing.

In accordance with the present invention, a fuel cell is constructed which incorporates a support or coolant plate fabricated from a polymer/metal composite such as polysulfone/nickel in combination with the other essential elements of the cell. These polymer/metal composites are conveniently fabricated into the diverse shapes and designs required in fuel cell support or coolant plates, are light in weight, and relatively inexpensive. Moreover, such composite polymer/metal materials can be fabricated to have thermal and electrical conductivity approaching the conductivity of metal while not being subject to corrosion to the extent that metal is subject to corrosion. Further, the composite materials have low thermal expansion and good compressive strengths and permit convenient fabrication using known polymer molding techniques with low mold shrinkage. The polymer/metal composites are less costly in comparison to lightweight metals such as magnesium normally used in view of the essential characteristics of the plates.

The polymer moiety of the polymer/metal composite must be capable of being molded, i.e., be thermoplastic; have good thermal properties; high flexural, tensile, and compressive strengths; and good hardness. Polymers meeting the aforesaid requirements include polysulfone, polyphenylene sulfide, polyphenylene oxide, acrylonitrilebutadiene-styrene co-polymers, polybutadiene, polyaryl ether, and polypropylene. Polysulfone resins are available commercially having the formula:

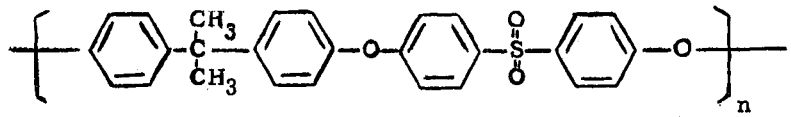

wherein n has a value of from 25 to 80. The distinctive feature of the polymer is the diphenylenesulfone group. Polysulfone resins are available under the trade name "Bakelite Polysulfone" of the Union Carbide Corporation. Polyphenylene sulfide resins are available commercially under the trade name "RYTON," a trademark of the Phillips Petroleum Company. Polyaryl ethers are available commercially under the tradename "ARYLON T," a trademark of the Uniroyal Company. Polyphenylene oxide, polypropylene, polybutadiene, and acrylonitrile-butadiene-styrene co-polymers are available under many commercial designations.

The metal to be employed in the polymer/metal composite is preferably nickel. However, other metals such as the stainless steels, silver, and gold which have good thermal and electrical conductivity characteristics, while being relatively inexpensive, can be utilized.

The amount of metal in the polymer/metal composite will vary from about 50 to 80 percent. The remainder of the composite will be polymer. It has been determined that below about 50 percent metal the necessary electrical conductivity is not realized. In amounts above 80 percent metal the advantages of the polymer are minimal. It has been determined, for example, when working with a polysulfone/nickel composite, that at 80 weight percent nickel the electrical resistivity is 0.00025 ohm centimeter. At 65 weight percent nickel the resistivity increases to 0.0005 ohm centimeter. At 50 weight percent nickel, the resistivity is 0.003 ohm centimeter. At 40 weight percent the resistivity increases, approaching 0.01 ohm centimeter. Accordingly, below about 50 weight percent nickel the electrical resistivity increases greatly, precluding effective conductivity in the support and coolant plates.

The polymer/metal composites are made by admixing the polymer and metal particles in the desired rations, and molding the mixture in the shape and form needed utilizing conventional molding techniques. Employing the aforesaid weight percentages, excellent structural integrity and strength are realized in the thin plates essential for compact fuel cell construction.

THE DRAWING AND SPECIFIC EMBODIMENTS

In order to more specifically illustrate the invention, reference is made to the drawing wherein a transverse sectional view of a fuel cell stack employing the coolant plates of the present invention is shown.

In the drawing the fuel cell stack preferably will comprise 12 or more individual cells, only two of which are shown in combination with a humidity exchange/scrubber unit commonly employed to condition the oxidant of the cell. Each fuel cell will comprise an anode 20, a cathode 30, and an electrolyte contained in electrolyte matrix 40. In the embodiment shown, electrodes 20 and 30 are lightweight screen electrodes comprising a conductive nickel screen embedded in a uniform admixture of catalytic metal — in this instance platinum — and polytetrafluoroethylene particles. The ratio of polymer to tetrafluoroethylene on a volume basis is 3:7, with the platinum loading of the electrode being 15 mg/cm$^2$. The electrodes are approximately 10 mils in thickness. The electrolyte matrix 40 is pressed asbestos and is approximately 25 mils in thickness. A fuel compartment 21 will be adjacent each anode and an oxidant compartment 31 will be adjacent each cathode. A heat exchange chamber 50 will separate the oxidant and fuel compartments of adjacent cells. A humidity exchanger/scrubber unit 60 will service the entire stack and comprises an air inlet 61 entering compartment 62. The humidity exchanger/scrubber unit will comprise means for removal of $CO_2$ and means for adding moisture to the air as the air is passed therethrough. Operable units are described in U.S. Pat. No. 3,411,951. Air after having been conditioned will flow through outlet 63 into manifold system 70 where it feeds the individual oxidant chambers of all of the cells of the cell stack. After the conditioned air passes through the fuel cells, it is vented through compartment 68 and outlet 69 of the humidity exchanger/scrubber unit. A coolant such as ethylene glycol is continuously circulated through manifold means 80, heat exchanger chamber 50 and chamber 81 of the humidity exchanger/scrubber unit. The coolant plates which are of corrugated design are of polysulfone/nickel containing 70 nickel and 30 polymer, as defined hereinabove. The coolant plates are easily fabricated in the corrugated design shown or in other designs. As a result of the good thermal conductivity and high electrical conductivity of the coolant plates, the cells can be maintained at a constant operating temperature while keeping the coolant flow at a relatively low rate. The cell will operate at a constant current drain with a substantially constant cell output, with there being little fluctuation in the current characteristics of the cell.

Although the present invention has been described with reference to lightweight electrodes and a matrix-type electrolyte in combination with the improved coolant plates, it is possible to utilize the coolant plates in combination with other electrodes such as the so-called Bacon-type electrodes as defined in U.S. Pat. No. 2,716,670, together with circulating electrolytes. As will be further apparent, various other modifications can be made in the over-all design of the cell to meet operating conditions. These modifications being within the ability of one skilled in the art are to be covered herein with the invention only being limited in accordance with the appended claims.

I claim:

1. An electrochemical cell comprising an anode, cathode, and electrolyte, said electrolyte being in ionic contact with each of said anode and cathode, and as an essential part of said cell, or a plurality of said cells, a support or coolant plate constructed and arranged with at least one of said anode, cathode, or electrolyte to effect sensible heat transfer, comprising a polymer/metal composite having a high thermal conductivity, said composite containing from 50 – 80 percent metal and from 50 – 20 percent polymer.

2. The electrochemical cell of claim 1 wherein the polymer of the polymer/metal composite is polysulfone.

3. The electrochemical cell of claim 1 wherein the polymer of the polymer/metal composite is polyphenylene sulfide.

4. The electrochemical cell of claim 1 wherein the polymer of the polymer/metal composite is polyphenylene oxide.

5. The electrochemical cell of claim 1 wherein the polymer of the polymer/metal composite is a copolymer of acrylonitrilebutadiene-styrene.

6. The electrochemical cell of claim 1 wherein the polymer of the polymer/metal composite is a polyaryl ether.

7. The electrochemical cell of claim 1 wherein the polymer/metal composite is polysulfone/nickel.

8. The electrochemical cell of claim 1 in which the electrolyte is retained in a matrix.

9. The electrochemical cell of claim 1 wherein the electrolyte is a circulating electrolyte.

10. A plurality of electrochemical cells of the type defined in claim 1 constructed and arranged as a battery.

* * * * *